United States Patent [19]
Lindberg

[11] Patent Number: 5,186,286
[45] Date of Patent: Feb. 16, 1993

[54] ELECTROMAGNETIC BRAKE

[75] Inventor: Teppo Lindberg, Nuppulinna, Finland

[73] Assignee: Kone Oy, Helsinki, Finland

[21] Appl. No.: 668,658

[22] Filed: Mar. 13, 1991

[30] Foreign Application Priority Data

Mar. 13, 1990 [FI] Finland ................... 901248

[51] Int. Cl.⁵ .................. F16D 9/02; F16D 55/22; F16D 65/52; F16D 59/02
[52] U.S. Cl. ................... 188/171; 188/161; 188/71.8; 188/196 V; 188/196 P; 188/72.3
[58] Field of Search ............... 188/171, 173, 163, 161, 188/158, 71.8, 71.7, 196 R, 196 P, 196 D, 196 V, 72.1, 72.3, 162; 310/77; 192/90, 111

[56] References Cited

U.S. PATENT DOCUMENTS

| | | | |
|---|---|---|---|
| 2,705,058 | 3/1955 | Harter | 188/196 P X |
| 3,095,068 | 6/1963 | Hansen | 188/171 |
| 3,221,854 | 12/1965 | Jaeschke et al. | 188/196 P X |
| 3,357,528 | 12/1967 | Verlinde | 188/171 |
| 3,391,768 | 7/1968 | Fixari | 188/196 P X |
| 3,394,787 | 7/1968 | Fitzgerald | 188/196 P X |
| 3,485,330 | 12/1969 | Reiff | 188/196 P X |
| 3,613,838 | 10/1971 | Pape | 188/196 P X |
| 3,613,849 | 10/1971 | Pape | 188/196 P X |
| 3,624,767 | 11/1971 | Kroeger | 188/196 P X |
| 4,071,121 | 1/1978 | Daniel | 188/171 X |
| 4,142,610 | 3/1979 | Alexander et al. | 188/171 X |
| 4,226,307 | 10/1980 | Dorot | 188/171 X |
| 4,966,255 | 10/1990 | Fossum | 188/196 P X |

FOREIGN PATENT DOCUMENTS

| | | | |
|---|---|---|---|
| 2314483 | 10/1974 | Fed. Rep. of Germany | 188/171 |
| 75653 | 7/1988 | Finland . | |
| 2605155 | 4/1988 | France | 188/171 |
| 52-25980 | 2/1977 | Japan | 188/171 |
| 148650 | 12/1978 | Japan | 188/171 |

Primary Examiner—Douglas C. Butler
Attorney, Agent, or Firm—Sughrue, Mion, Zinn, Macpeak & Seas

[57] ABSTRACT

An electromagnetic brake is disclosed which comprises a brake wheel, a friction surface touching the brake wheel during braking and attached to an anchor plate moved by brake springs and an electromagnet which disengages the friction surface from contact with the brake wheel when a current is supplied to the magnet. To compensate for the wear of the friction surface, the brake has at least one retainer mounted on a bolt or shaft lying parallel to the axial direction of the brake. The retainer moves with the anchor plate towards the brake wheel and is provided with a directional element which limits the motion of the anchor plate away from the brake wheel. The brake is also provided with a wedge ring rotated by a spring which serves to move the electromagnet towards the brake wheel.

12 Claims, 5 Drawing Sheets

ELECTROMAGNETIC BRAKE

FIELD OF THE INVENTION

The present invention relates to an electromagnetic brake which is released by the action of the electromagnet when power is supplied to the electromagnet, and engaged when power supply to the electromagnet is cut off.

BACKGROUND TO THE INVENTION

In electromagnetic disc or drum brakes, the working clearance between the electromagnet and the anchor plate (when the brake is in the closed position) tends to increase, due to the wear of the friction surfaces and the brake wheel. An increase in this working clearance leads to a decreased force of attraction between the magnet and the anchor plate, and consequent difficulties in releasing of the brake. Another consequence of this increased working clearance is a decreased brake spring force, which results in reduced braking torque. In addition, a large working clearance increases the speed of the anchor plate movement (thus increasing the impact force applied to the friction surfaces) when the brake is being engaged. The result of this is a high initial peak in braking torque which imposes a high stress on the brake and other structures and deteriorates the operating characteristics of the brake. Moreover, the reliability of the brake suffers due to the higher stress level, and the stresses may become uncontrollable due to insufficient servicing.

FI publication 75653 proposes an electromagnetic disc brake in which, when the brake is closed, a constant gap between the electromagnet coil and the anchor plate is maintained by means of a stepless adjusting device. This adjusting device is provided with balls running in groove tracks at that end where the electromagnet frame is located. An alternative adjusting device employs a wedge placed between the frame and the electromagnet coil. The said wedge moves downwards due to its own weight, thereby adjusting the size of the air gap.

SUMMARY OF THE INVENTION

An object of the present invention is to provide an electromagnetic brake in which means is provided for improved adjustment of the working clearance.

The electromagnetic brake of the invention is characterised as comprising: a brake wheel slidably disposed about an axle of the brake; a friction plate fixedly attached to a frame of the brake; an anchor plate movable in an axial direction of the brake; at least two friction surfaces frictionally engaging said brake wheel during braking, said friction surfaces being fixedly disposed on each of said friction plate and said anchor plate respectively; at least one brake spring for urging said anchor plate toward said brake wheel so as to force said friction surfaces into frictional engagement with said brake wheel; an electromagnet disposed in operative relation to said anchor plate, said electromagnet serving to disengage said friction surfaces from said brake wheel when a current is supplied to said electromagnet; and compensating means for compensating for wear of said friction surfaces and thereby maintain a substantially constant predetermined clearance between said and said anchor plate when said friction surfaces are in frictional engagement with said brake wheel. The compensating means comprises: at least one substantially U-shaped retainer, each of said at least one retainer being slidably mounted on a respective shaft disposed parallel to the axel of the brake, wherein each said retainer comprises a front flange facing toward said brake wheel and a rear flange facing away from said brake wheel, and wherein said front and rear flanges are disposed on opposite sides of said anchor plate; a directional element disposed about each said shaft between said anchor plate and said rear flange of each said retainer, said directional element being adapted to limit the motion of said anchor plate away from said brake wheel to a predetermined amount sufficient to ensure release of the brake; wedge means for moving said electromagnet towards said brake wheel; and spring means for urging said wedge means in a predetermined direction to thereby urge said electromagnet towards said brake wheel.

The invention achieves a brake with a substantially constant air gap, which means that a smaller brake magnet can be used. Moreover, the brake permits the presence of a large number of tolerances, and the working clearance can be adjusted by the stopping means, for example, spring loaded pins. The adjustment is even and simple, and remains functional through at least the range of motion required to accommodate wear of the friction surfaces.

BRIEF DESCRIPTION OF THE DRAWINGS

In the following, the invention is described in detail by the aid of examples referring to the attached drawings, in which.

DETAILED DESCRIPTION OF THE PREFERRED EMBODIMENTS

Figure 1:
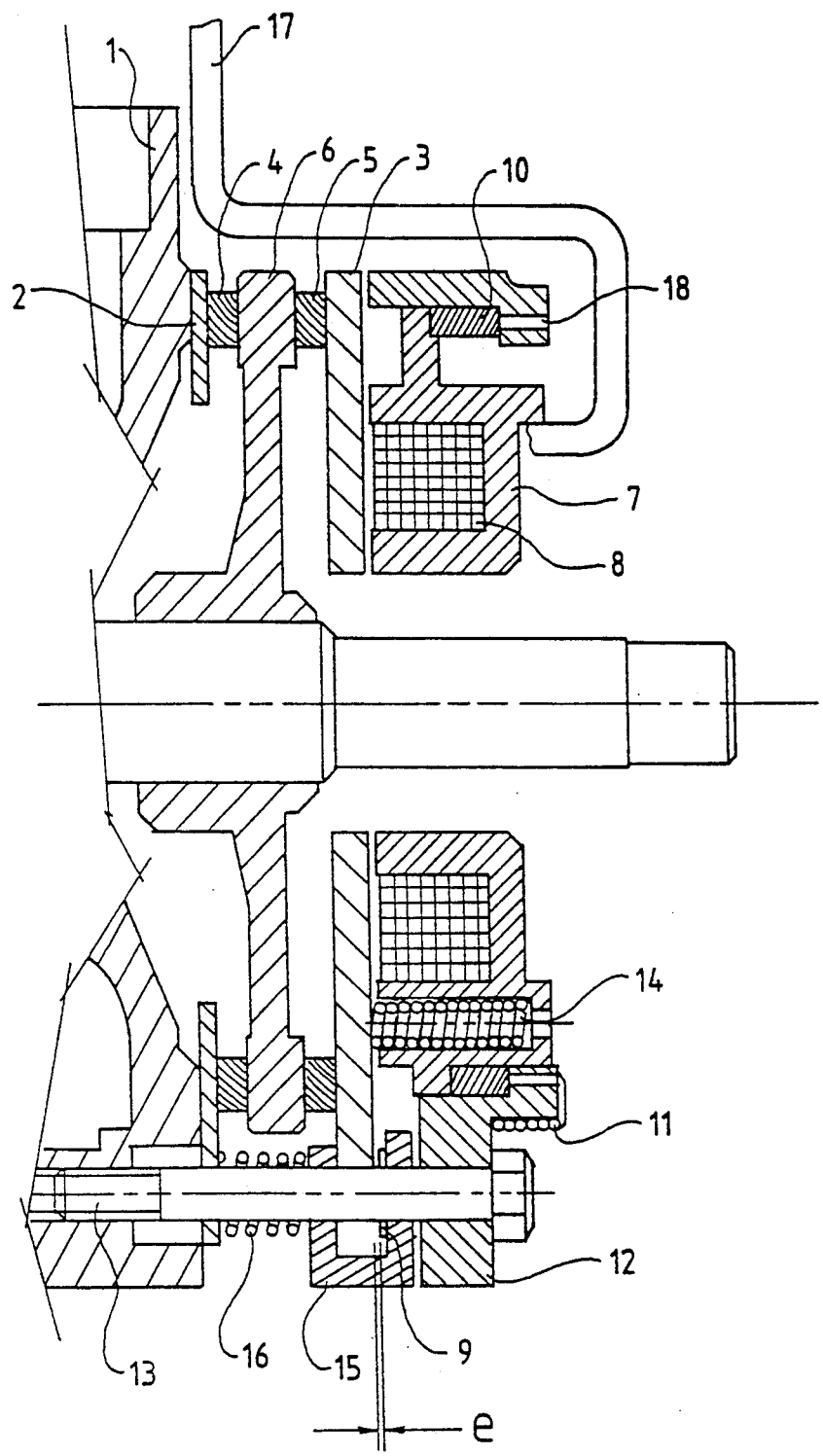
FIG. 1 is a cross-sectional view of a disc brake according to a first embodiment of the invention.

FIG. 1 illustrates an electromagnetic brake which may be employed with an electric motor, for example the hoisting motor of a crane. The magnetic brake comprises an adjustment system for compensating the wear of the friction material.

The brake comprises an end shield 1, on which a friction plate 2 is fixedly disposed. An anchor plate 3 is disposed opposite the friction plate. Interposed between the friction plate 2 and the anchor plate 3, is a brake wheel 6 which is adapted to the axle of the motor by means of splines (not shown), which permit the brake wheel 6 to move along the axle. Friction surfaces 4 and 5, are disposed on the friction plate 2 and the anchor plate 3, respectively, and face toward the brake wheel 6. Proximal to the anchor plate 3 is an electromagnet comprising an electromagnet housing 7, which is substantially U-shaped in cross-section, and a winding 8 accommodated therein. Notice that the groove of the electromagnet housing 7 points towards the anchor plate 3.

The brake frame comprises a wedge housing 12 attached to the end shield 1 through stud bolts 13 (only one of which is illustrated in FIG. 1). Braking torque is generated by causing the anchor plate 3 to move towards the friction plate 2 so as to force the friction surfaces 4 and 5 into frictional engagement with the brake wheel 6. Movement of the anchor plate 3 is accomplished by means of brake springs 14 which bear against the electromagnet housing 7, which in turn is supported by the wedge housing 12 via a wedge ring 10. The friction plate 2 and the anchor plate 3 are prevented from rotation, under braking torque, by the stud bolts 13. Note that the anchor plate 3 can move axially along the stud bolts 13. The anchor plate 3 is disposed within respective retainers 15, disposed on each of the stud bolts 13, which retainers 15 have a substantially U-shaped cross-section formed by a front flange and a rear flange. Respective retainer springs 16 are disposed about each stud bolt 13 between the friction plate 2 and the front flange of the respective retainer 15, so as to urge the retainers 15, and thus the anchor plate 3, away from the brake wheel 6. Interposed between the rear flange of each retainer 15, and the anchor plate 3, is a respective washer 9. Each retainer 15 has a backlash e relative to the anchor plate 3, permitting the anchor plate 3 to move rearwards (to the right in FIG. 1) by an amount equal to the backlash e, until the anchor plate 3 contacts the washers 9. The washer 9 is adapted to be moved axially along the stud bolt 13 by the rear flange of the retainer 15, but locks in position when a rearward force is applied thereto by the anchor plate 3 during opening of the brake.

In order to compensate for wear of the friction surfaces 4 and 5, the position of both the anchor plate 3 and the electromagnet 7 and 8, when the brake is open, progressively moves towards the brake wheel 6. Movement of the anchor plate 3 is achieved by means of the washers 9, while the electromagnet housing 7 motion is achieved by means of a wedge ring 10 moved by a coiled spring 11, as is described in greater detail below.

When no current is flowing in the magnet winding 8, the anchor plate 3 is forced by the brake springs 14 towards the friction plate 2, thereby closing the brake. With wear of the friction surfaces 4 and 5, the anchor plate 3 moves progressively further towards the brake wheel 6 (to the left in FIG. 1), carrying the retainer 15 and the washer 9 along with it. As this occurs, the width of the clearance between the electromagnet housing 7 and the anchor plate 3 increases.

When a current is supplied to the electromagnet winding 8 via a conductor 17 in order to release the brake, the anchor plate 3 and electromagnet housing 7 move towards each other at acceleration rates determined by the magnetic, frictional, inertial and spring forces acting on the anchor plate 3 and electromagnet respectively. The force of the retainer springs 16 ensures a maximal acceleration of the anchor plate 3, thereby ensuring that the anchor plate 3 makes contact with and is stopped by the washers 9, prior to the electromagnet contacting the anchor plate 3. This has the result of developing a maximal release clearance between the brake wheel 6 and the anchor plate 3.

Adjustment of the working clearance is effected by the washers 9, which only allow the anchor plate 3 to move away from the brake wheel by a predetermined distance (the backlash e of the retainer 15). During attraction by the magnet, the anchor moves rapidly and then stops at a position determined by the washers 9, while the electromagnet 7 and 8, being slower, continues to move towards the anchor plate 3. If the friction surfaces are worn, a gap will appear between the electromagnet housing 7 and the wedge housing 12. This gap is filled by rotation of the wedge ring 10, which is turned by the coiled spring 11.

Spring-loaded pins 18 are slidably disposed in holes provided in the end of the wedge housing 12. The pins 18 protrude through the end of the wedge housing and are urged by springs (not shown) to frictionally engage the wedge ring 10. The pins 18 prevent the ring 10 from moving during attraction while the electromagnet 7 and 8 is still moving and before the anchor 3 is stopped by the washer 9. This effectively prevents over-compensation caused by the wedge ring 10 immediately filling any gap between the wedge housing 12 and the electromagnet housing 7 when it moves toward the anchor 3. In the extreme, this over-compensation could render the brake inoperative by reducing the working clearance to nil, and thereby preventing the brake from being released.

Figure 2:
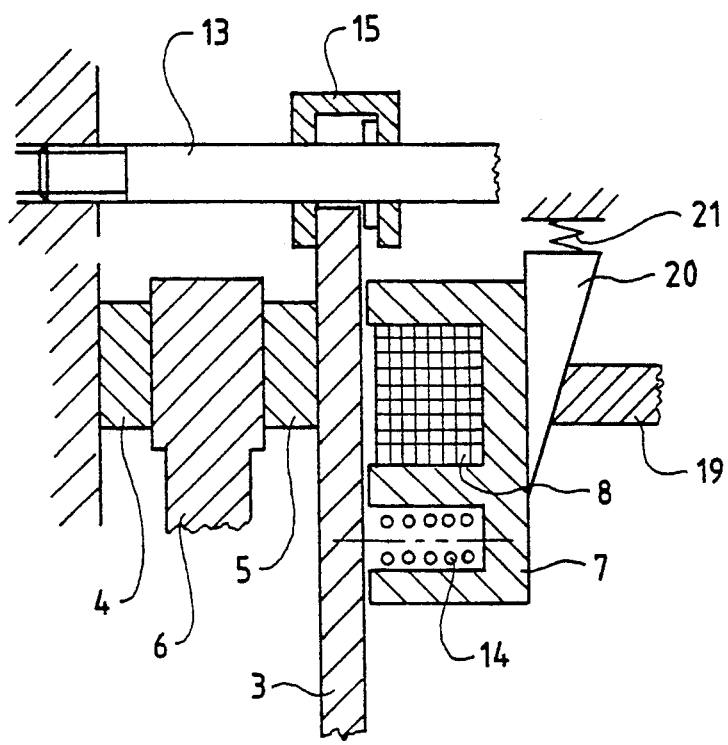
FIG. 2 is a cross-sectional view of part of a disc brake according to a second embodiment of the invention.

FIG. 2 illustrates a second embodiment of the invention. In this case, the disc brake uses a back-wedge adjustment system, in which the anchor plate 3 is pressed against the brake wheel 6 by a brake spring 14 which bears against the electromagnet housing 7 as in the first embodiment described above. Between the electromagnet housing 7 and the back stop 19 is disposed a downward-pointing wedge 20 which is urged into the space between the electromagnet housing 7 and the backstop 19 by a wedge spring 21. As the brake is released, the anchor plate 3 is drawn away from the brake wheel through a distance corresponding to the backlash e of the retainer 15, which is determined by the washer 9.

With the wear of the friction material, the anchor plate 3 carries the retainer 15 towards the brake wheel 6. Thus, when the brake is released, the anchor plate 3 stops before hitting the electromagnet housing 7. As a result, the electromagnet housing 7 continues to move towards the brake wheel. This movement of the electromagnet housing 7 causes a gap to appear between the wedge 20 and the electromagnet housing 7. This gap is filled as the wedge 20 is moved by the spring 21.

Figure 1A:
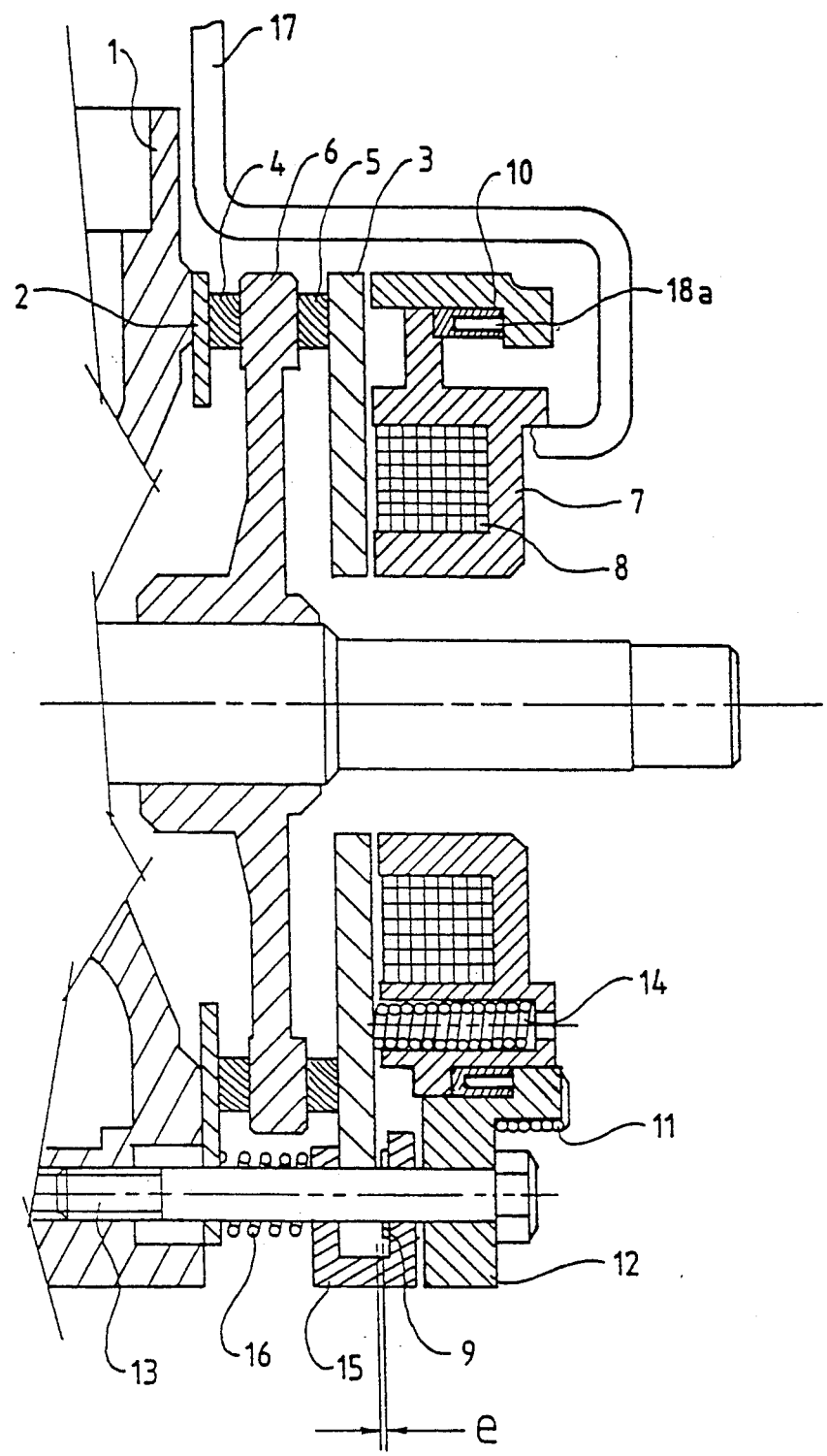
FIGS. 1a, 1b and 1c illustrate three alternative embodiments of the present invention illustrated in FIG. 1.
Figure 1B:
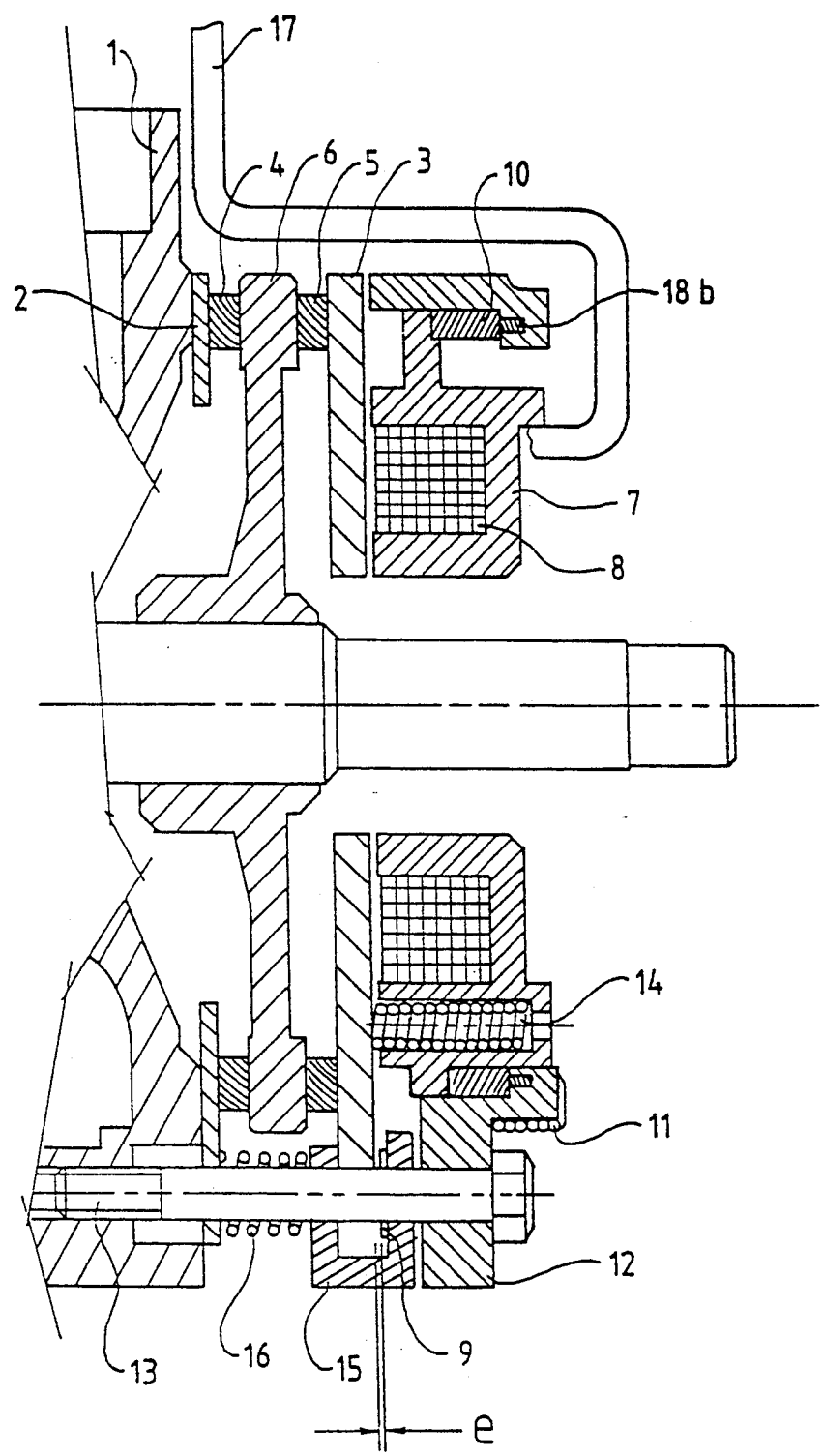

It will be apparent to a person skilled in the art that different embodiments of the invention are not restricted to the examples described above, but that they may instead be varied within the scope of the following claims. For example, instead of pins it is possible to use an O-ring mounted in a groove in the wedge housing and protruding therefrom so as to engage the wedge ring. Alternatively, the wedge ring can be made from a flexible-material, as shown in FIG. 1b.

Figure 1C:
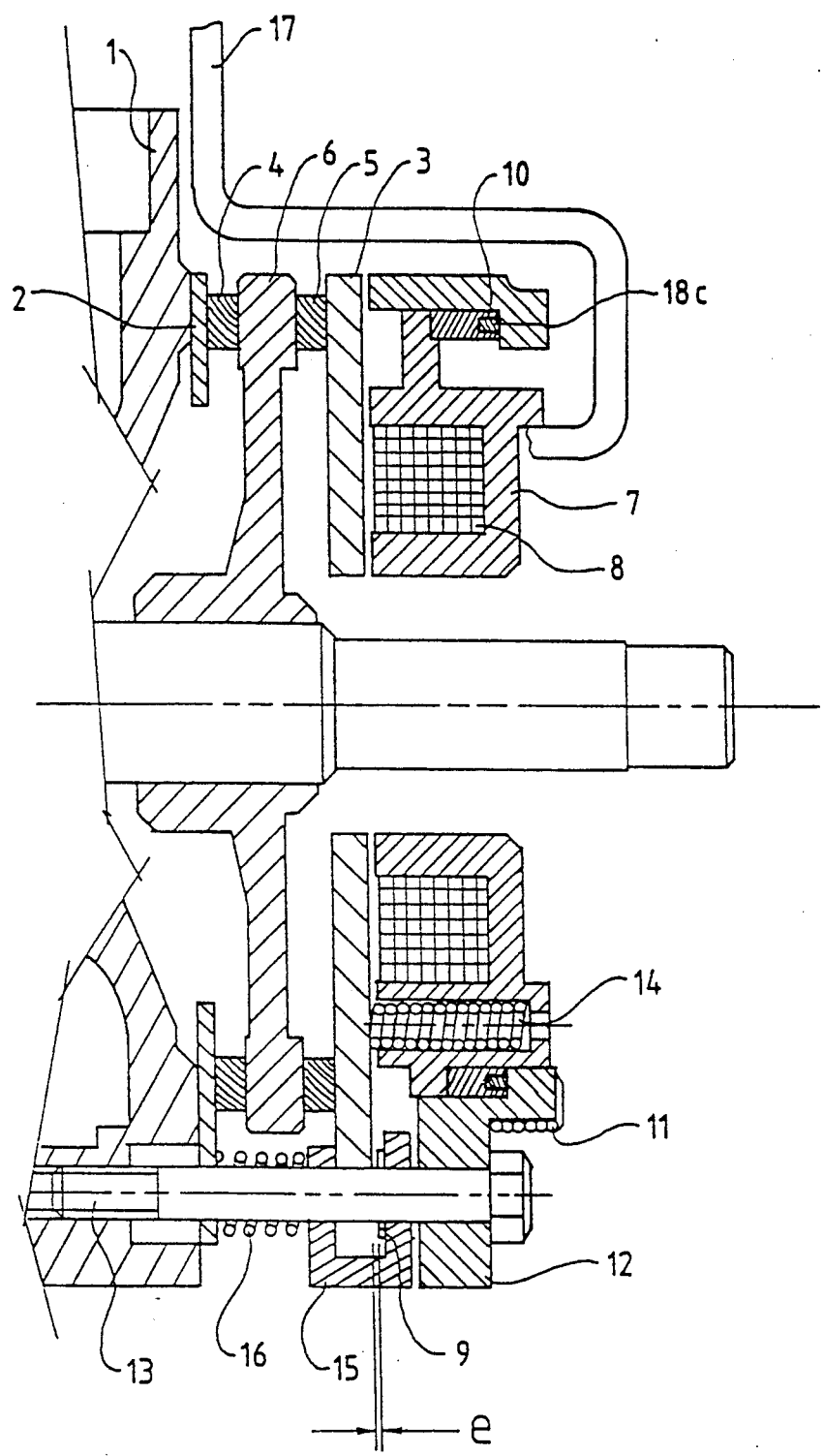

As a still further alternative, spring-loaded pins or elastic members (such as an O-ring) can be mounted in the wedge ring itself. For example, FIG. 1a illustrates an embodiment of the invention in which spring loaded pins 18a are mounted in the wedge ring 10 and protrude towards the wedge ring housing 12. FIG. 1c illustrates an embodiment of the invention in which an O-ring 18c is mounted in the wedge ring 10 and protrudes towards the wedge ring housing 12.

I claim:
1. An electromagnetic brake comprising:
   a. a brake wheel slidably disposed about an axle of the brake;
   b. a friction plate fixedly attached to a frame of the brake;
   c. an anchor plate movable in an axial direction of the brake;
   d. at least two friction surfaces frictionally engaging said brake wheel during braking, said friction surfaces being fixedly disposed on said friction plate and said anchor plate respectively;
   e. at least one brake spring for urging said anchor plate toward said brake wheel so as to force said friction surfaces into frictional engagement with said brake wheel;

f. an electromagnet disposed in operative relation to said anchor plate, said electromagnet serving to disengage said friction surfaces from said brake wheel when a current is supplied to said electromagnet; and g. compensating means for compensating for wear of said friction surfaces and thereby maintaining a substantially constant predetermined clearance between said electromagnet and said anchor plate when said friction surfaces are in frictional engagement with said brake wheel;

wherein said compensating means comprises:

(i) at least one shaft disposed parallel to, and radially spaced form the axle of the brake;

(ii) a respective substantially U-shaped retainer slidably mounted on each said shaft, wherein said retainer comprises a front flange facing toward said brake wheel and a rear flange facing away from said brake wheel, said front and rear flanges being disposed on opposite sides of said anchor plate;

(iii) a respective directional element disposed about each said shaft between said anchor plate and said rear flange of said respective retainer, said directional element serving to limit the motion of said anchor plate away from said brake wheel to a predetermined amount sufficient to ensure release of the brake;

(iv) wedge means for moving said electromagnet towards said brake wheel; and (v) spring means for urging said wedge means in a predetermined direction to thereby urge said electromagnet towards said brake wheel.

2. A brake as claimed in claim 1, wherein said wedge means is a wedge ring disposed within a wedge housing, said electromagnet being urged to move toward said brake wheel when said wedge ring rotates in a predetermined direction.

3. A brake as claimed in claim 2, wherein said spring means is a coiled spring disposed in said wedge housing and serving to rotate said wedge ring in said predetermined direction.

4. A brake as claimed in claim 2, wherein said compensating means further comprises at least one spring-loaded pin disposed in said wedge housing and protruding towards said wedge ring, said at least one pin serving to prevent rotation of said wedge ring and movement of said electromagnet towards said brake wheel beyond that necessary to compensate for wear of said friction surfaces.

5. A brake as claimed in claim 2, wherein said compensating means further comprises at least one spring-loaded pin disposed in said wedge ring and protruding towards said wedge housing, said at least one pin serving to prevent rotation of said wedge ring and movement of said electromagnet towards said brake wheel beyond that necessary to compensate for wear of said friction surfaces.

6. A brake as claimed in claim 2, wherein each said shaft is a stud bolt, each said stud bolt serving to support said anchor plate as well as said respective retainer and directional element in slidable relation thereon, and further serving to support said wedge housing in fixed relation to said brake frame.

7. A brake as claimed in claim 2, wherein said compensating means further comprises at least one resilient elastic member disposed in said wedge housing and protruding towards said wedge ring, said at least one resilient elastic member serving to prevent rotation of said wedge ring and movement of said electromagnet towards said brake wheel beyond that necessary to compensate for wear of said friction surfaces.

8. A brake as claimed in claim 2, wherein said compensating means further comprises at least one resilient elastic member disposed in said wedge ring and protruding towards said wedge housing, said at least one resilient elastic member serving to prevent rotation of said wedge ring and movement of said electromagnet towards said brake wheel beyond that necessary to compensate for wear of said friction surfaces.

9. A brake as claimed in claim 1, wherein said wedge means is a wedge disposed between said electromagnet and a wedge housing, said electromagnet being urged to move toward said brake wheel when said wedge is moved into a space between said electromagnet and said wedge housing.

10. A brake as claimed in claim 9, wherein said spring means is a spring disposed in said wedge housing and serving to force said wedge between said wedge housing and said electromagnet.

11. A brake as claimed in claim 1, wherein said directional element is a self-locking washer.

12. A brake as claimed in claim 1, wherein said compensating means further comprises at least one respective auxiliary spring disposed between said friction plate and the front flange of each said retainer, said at least one auxiliary spring serving to urge said retainer and said anchor plate away from said brake wheel.

* * * * *